(12) United States Patent
Xu et al.

(10) Patent No.: US 7,197,388 B2
(45) Date of Patent: Mar. 27, 2007

(54) ROLL STABILITY CONTROL SYSTEM FOR AN AUTOMOTIVE VEHICLE USING AN EXTERNAL ENVIRONMENTAL SENSING SYSTEM

(75) Inventors: Liwen Xu, Southfield, MI (US); Samir M. Beydoun, Dearborn Heights, MI (US); Gerald H. Engelman, Plymouth, MI (US); Aaron L. Mills, Ann Arbor, MI (US); Jianbo Lu, Livonia, MI (US); Keith Glenn Mattson, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 141 days.

(21) Appl. No.: 10/605,930

(22) Filed: Nov. 6, 2003

(65) Prior Publication Data

US 2005/0102083 A1 May 12, 2005

(51) Int. Cl.
B60R 21/13 (2006.01)
G06F 19/00 (2006.01)

(52) U.S. Cl. .......................... 701/70; 701/38; 180/282; 348/108

(58) Field of Classification Search .................. 701/70, 701/71, 72, 38, 82, 90, 36, 96; 280/735, 280/5.502; 382/104, 106, 107, 108; 348/142, 348/42; 340/440, 461; 180/282
See application file for complete search history.

(56) References Cited

U.S. PATENT DOCUMENTS

| | | | |
|---|---|---|---|
| 5,328,255 A | 7/1994 | Isella | 303/140 |
| 5,436,835 A | 7/1995 | Emry | 701/70 |
| 5,485,378 A | 1/1996 | Franke et al. | 701/41 |
| 5,711,585 A | 1/1998 | Tozu et al. | 303/146 |
| 5,752,214 A | 5/1998 | Minowa et al. | 701/111 |
| 5,892,855 A | 4/1999 | Kakinami et al. | 382/291 |
| 5,902,345 A | 5/1999 | Minowa et al. | 701/96 |
| 5,913,375 A * | 6/1999 | Nishikawa | 180/168 |
| 6,029,764 A * | 2/2000 | Schubert | 180/89.13 |
| 6,062,659 A | 5/2000 | Matsuda | 303/160 |
| 6,065,558 A * | 5/2000 | Wielenga | 180/282 |
| 6,076,034 A | 6/2000 | Satoh et al. | 701/70 |
| 6,138,066 A * | 10/2000 | Guo et al. | 701/38 |
| 6,169,946 B1 * | 1/2001 | Griessbach | 701/45 |
| 6,182,783 B1 * | 2/2001 | Bayley | 180/282 |
| 6,285,393 B1 | 9/2001 | Shimoura et al. | 348/119 |
| 6,292,111 B1 * | 9/2001 | Ishikawa et al. | 340/937 |
| 6,411,204 B1 | 6/2002 | Bloomfield et al. | 340/467 |
| 6,438,464 B1 * | 8/2002 | Woywod et al. | 701/1 |
| 6,535,114 B1 * | 3/2003 | Suzuki et al. | 340/435 |
| 6,556,908 B1 | 4/2003 | Lu et al. | 701/38 |
| 6,564,140 B2 | 5/2003 | Ichikawa et al. | 701/91 |
| 6,567,748 B2 | 5/2003 | Matsuno | 701/301 |

(Continued)

Primary Examiner—Tan Q. Nguyen
(74) Attorney, Agent, or Firm—Fredrick Owens

(57) ABSTRACT

A roll stability control system (18) for an automotive vehicle (10) includes an external environment sensing system, such as a camera-based vision system, or a radar, lidar or sonar-based sensing system (43) that generates image, radar, lidar, and/or sonar-based signals. A controller (26) is coupled to the sensing system and generates dynamic vehicle characteristic signals in response to the image, radar, lidar, or sonar-based signals. The controller controls the rollover control system (18) in response to the dynamic vehicle control signal. The dynamic vehicle characteristics may include roll related angles, angular rates, and various vehicle velocities.

35 Claims, 5 Drawing Sheets

U.S. PATENT DOCUMENTS

| | | |
|---|---|---|
| 6,593,849 B2 * | 7/2003 | Chubb et al. ............... 340/446 |
| 6,622,076 B1 | 9/2003 | Eckert et al. ................ 701/70 |
| 6,631,317 B2 | 10/2003 | Lu et al. ..................... 701/45 |
| 6,757,595 B1 * | 6/2004 | Bauer ........................... 701/1 |
| 6,799,092 B2 * | 9/2004 | Lu et al. ........................ 701/1 |
| 2001/0054816 A1 | 12/2001 | Brambilla et al. .......... 280/806 |
| 2002/0095253 A1 | 7/2002 | Losey et al. ................. 701/82 |
| 2003/0001734 A1 | 1/2003 | Schofield et al. ........... 340/442 |
| 2003/0021445 A1 | 1/2003 | Larice et al. ............... 382/104 |
| 2003/0055549 A1 * | 3/2003 | Barta et al. ................... 701/70 |
| 2003/0060980 A1 * | 3/2003 | Prakah-Asante et al. .... 701/301 |
| 2004/0096082 A1 * | 5/2004 | Nakai et al. ................ 382/104 |
| 2004/0128060 A1 * | 7/2004 | Park ........................... 701/124 |
| 2005/0110227 A1 * | 5/2005 | Stefan et al. ............ 280/5.501 |
| 2005/0114072 A1 * | 5/2005 | Choi .......................... 702/141 |
| 2005/0168575 A1 * | 8/2005 | Mattes et al. ............... 348/148 |

* cited by examiner

ROLL STABILITY CONTROL SYSTEM FOR AN AUTOMOTIVE VEHICLE USING AN EXTERNAL ENVIRONMENTAL SENSING SYSTEM

BACKGROUND OF INVENTION

The present invention relates generally to a dynamic behavior control apparatus for an automotive vehicle, and more specifically, to a method and apparatus for controlling the roll characteristics of the vehicle by determining roll characteristics using at least in part a camera, radar, lidar, or sonar-based system.

Dynamic control systems for automotive vehicles have recently begun to be offered on various products. Dynamic control systems typically control the yaw of the vehicle by controlling the braking effort at the various wheels of the vehicle. Yaw control systems typically compare the desired direction of the vehicle based upon the steering wheel angle and the direction of travel. By regulating the amount of braking at each corner of the vehicle, the desired direction of travel may be maintained. Typically, the dynamic control systems do not address roll of the vehicle. For high profile vehicles in particular, it would be desirable to control the rollover characteristic of the vehicle to maintain the vehicle position with respect to the road. That is, it is desirable to maintain contact of each of the four tires of the vehicle on the road.

In vehicle roll stability control it is desired to alter the vehicle attitude such that its motion along the roll direction is prevented from achieving a predetermined limit (rollover limit) with the aid of the actuation from the available active systems such as controllable brake system, steering system and suspension system. Although the vehicle attitude is well defined, direct measurement is usually impossible.

There are two types of vehicle attitudes needed to be distinguished. One is the so-called global attitude, which is sensed by the angular rate sensors. The other is the relative attitude, which measures the relative angular positions of the vehicle with respect to the road surface on which the vehicle is driven. The global attitude of the vehicle is relative to an earth frame (or called the inertia frame), sea level, or a flat road. It can be directly related to the three angular rate gyro sensors. While the relative attitude of the vehicle measures the relative angular positions of the vehicle with respect to the road surface, which are always of various terrains. Unlike the global attitude, there are no gyro-type sensors that can be directly related to the relative attitude. A reasonable estimate is that a successful relative attitude sensing system utilizes both the gyro-type sensors (when the road becomes flat, the relative attitude sensing system recovers the global attitude) and some other sensor signals.

One reason to distinguish relative and global attitude is due to the fact that vehicles are usually driven on a three-dimensional road surface of different terrains, not always on a flat road surface. Driving on a road surface with a large road bank does increase the rollover tendency, i.e., a large output from the global attitude sensing system might well imply an uncontrollable rollover event regardless of the flat road driving and the 3-D road driving. However driving on a three-dimensional road with moderate road bank angle, the global attitude may not be able to provide enough fidelity for a rollover event to be distinguished. Vehicular rollover happens when one side of the vehicle is lifted from the road surface with a long duration of time without returning back. If a vehicle is driven on a banked road, the global attitude sensing system will pick up certain attitude information even when the vehicle does not experience any wheel lifting (four wheels are always contacting the road surface). Hence a measure of the relative angular positions of the vehicle with respect to the portion of the road surface on which the vehicle is driven provides more fidelity than global attitude to sense the rollover event when the vehicle is driven on a road with a moderate bank angle. Such an angle is called body-to-road roll angle and it is used as one of the key variables in the roll stability control module to compute the amount of actuation needed for preventing an untripped rollover event.

When the vehicle does not have one side lifted, U.S. Pat. No. 6,556,908 does provide a method to calculate the relative attitudes and their accuracy may be affected by the vehicle loading, suspension and tire conditions. However, during a potential rollover event, such a relative roll angle is not a good measure of the true relative roll angle between vehicle body and the road surface. U.S. patent application Ser. No. 10/459,697, filed Jun. 11, 2003 (Attorney Docket No. 201-0938 (FGT1660)) provides another way to compute the true relative roll angle during a potential rollover event. This application is suited for cases where vehicle loading and suspension conditions are very close to the nominal systems. If the vehicle has large loading variations (especially roof loading), potential inaccuracy could cause false activations in roll stability controls.

During a potential rollover event, one or two wheels on the inside of the vehicle turn are up in the air and there is an angle between the axle of the lifted wheel and road surface. Such an angle is called a wheel departure angle. If such a wheel departure can be somehow characterized, the true body-to-road roll angle can be conceptually obtained as the sum of the wheel departure angle and the relative roll angle calculated in U.S. Pat. No. 6,556,908.

Another way to capture the true body-to-road roll angle is to use the resultant angle obtained by subtracting the road bank angle for the global roll angle calculated for example in U.S. Pat. No. 6,631,317. Although this method is theoretically feasible, it has inevitable drawbacks. The first drawback lies in the computation of the road bank angle, since there is no robust and accurate computation of road banks using the existing sensor set. Secondly, the global roll angle computation as shown in U.S. Pat. No. 6,631,317 may be affected by the accuracy of the low frequency bank angle estimation.

Therefore, the aforementioned two methods of computing the body-to-road roll angle may not deliver accurate enough body-to-road roll angle for roll stability control purpose in certain situations.

Various accident avoidance systems are being developed that have cameras mounted in the vehicle. Some systems also use the camera in determining when to deploy an airbag. These systems, however, do not prevent the vehicle from rolling over. Such systems merely react to a condition to reduce occupant injury.

Therefore, it is desirable in vehicle dynamics control, especially for roll stability control to detect accurately various roll angles associated with the vehicle and road to accurately predict the true roll position of the vehicle to properly activate the vehicle control systems.

SUMMARY OF INVENTION

One advantage of the invention is that the camera, radar, lidar, or sonar-based systems can be used alone or together with various sensors. The camera, radar, lidar, or sonar-based systems may provide a check to the sensor outputs.

Other objects and features of the present invention will become apparent when viewed in light of the detailed description of the preferred embodiment when taken in conjunction with the attached drawings and appended claims.

DETAILED DESCRIPTION

Figure 1:
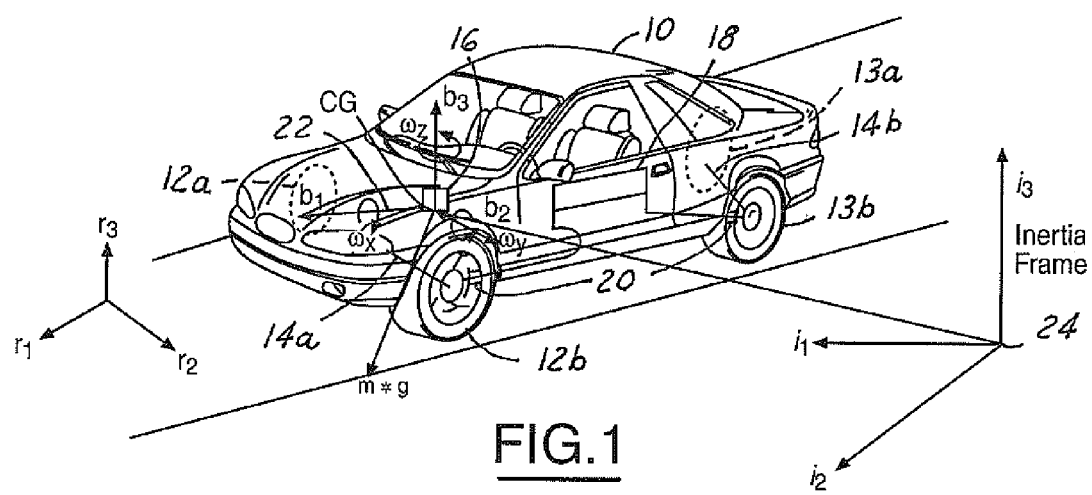
FIG. 1 is a diagrammatic view of a vehicle with variable vectors and coordinated frames according to the present invention.

In the following figures the same reference numerals will be used to identify the same components.

The present invention may be used in conjunction with a rollover control system for a vehicle. The system may be used with various dynamic control systems such as, but not limited to, anti-lock brakes, traction control and yaw control systems. The present invention will be discussed below in terms of preferred embodiments relating to an automotive vehicle moving in a three-dimensional road terrain. Further, the various image detection and sensors may be used alone or in various combinations depending on the conditions. For example, sensors may be used to check the image or radar signals or vice versa.

Referring to FIG. 1, an automotive vehicle 10 with a safety system of the present invention is illustrated with the various forces and moments thereon during a rollover condition. Vehicle 10 has front right and front left tires 12a and 12b and rear right tires 13a and left rear tires 13b respectively. The vehicle 10 may also have a number of different types of front steering systems 14a and rear steering systems 14b including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels, or vice versa. Generally, the vehicle has a weight represented as Mg at the center of gravity of the vehicle, where g=9.8 m/s² and M is the total mass of the vehicle.

The sensing system 16 may use a standard yaw stability control sensor set (including lateral accelerometer, yaw rate sensor, steering angle sensor and wheel speed sensor) together with a roll rate sensor and a longitudinal accelerometer. Of course, the actual sensors used will vary depending on the type of dynamic control system. The various possible sensors will be further described below. The wheel speed sensors 20 are mounted at each corner of the vehicle, and the rest of the sensors of sensing system 16 are preferably mounted directly on the center of gravity of the vehicle body, along the directions x, y and z shown in FIG. 1. As those skilled in the art will recognize, the frame from $b_1$, $b_2$ and $b_3$ is called a body frame 22, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. The angular rates of the car body are denoted about their respective axes as $\omega_x$ for the roll rate, $\omega_y$ for the pitch rate, and $\omega_z$ for the yaw rate. The present invention calculations preferably take place in an inertial frame 24 that may be derived from the body frame 22 as described below.

Figure 2:
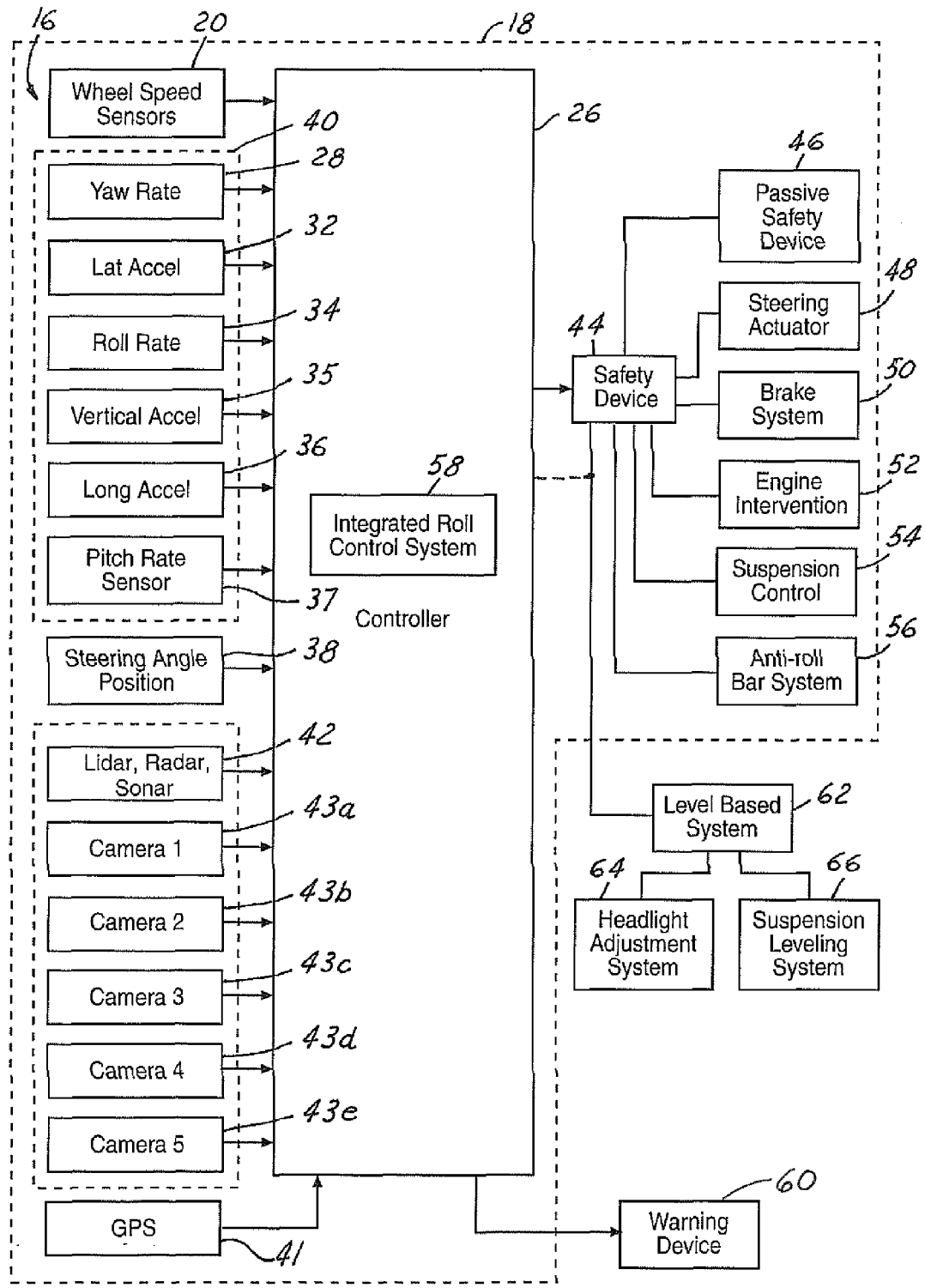
FIG. 2 is a block diagram of a stability system according to the present invention.

As will be described below, the sensing system 16 may also include a lidar, radar and/or sonar sensor, cameras and/or a GPS system (all of which are shown in FIG. 2 below).

The angular rate sensors and the accelerometers are mounted on the vehicle car body along the body frame directions $b_1$, $b_2$ and $b_3$, which are the x-y-z axes of the vehicle's sprung mass.

The longitudinal acceleration sensor is mounted on the car body located at the center of gravity, with its sensing direction along $b_1$-axis, whose output is denoted as $a_x$. The lateral acceleration sensor is mounted on the car body located at the center of gravity, with its sensing direction along $b_2$-axis, whose output is denoted as $a_y$.

The other frame used in the following discussion includes the road frame, as depicted in FIG. 1. The road frame system $r_1 r_2 r_3$ is fixed on the driven road surface, where the $r_3$ axis is along the average road normal direction computed from the normal directions of the four-tire/road contact patches.

In the following discussion, the Euler angles of the body frame $b_1 b_2 b_3$ with respect to the road frame $r_1 r_2 r_3$ are denoted as $\theta_{xbr}$, $\theta_{ybr}$ and $\theta_{zbr}$, which are also called the relative Euler angles.

Referring now to FIG. 2, roll stability control system 18 is illustrated in further detail having a controller 26 used for receiving information from a number of sensors which may include speed sensors 20, a yaw rate sensor 28, a lateral acceleration sensor 32, a roll rate sensor 34, a vertical acceleration sensor 35, a longitudinal acceleration sensor 36, a pitch rate sensor 37, and steering angle position sensor 38. Sensors 28–38 may be part of an integrated measurement unit 40 or IMU.

In one embodiment the sensors are located at the center of gravity of the vehicle. Those skilled in the art will recognize that the sensor may also be located off the center of gravity and translated equivalently thereto.

Lateral acceleration, roll orientation and speed may be obtained using a global positioning system (GPS) 41.

The controller 26 may also be coupled to a lidar, radar, or sonar 42. The lidar, radar, or sonar 42 may be used to generate a velocity signal of an object. The radar or lidar may also be used to generate a trajectory signal of an object. Likewise, the velocity of the vehicle in various directions may be obtained relative to a stationary object. A lidar, radar, or sonar sensor 42 may be mounted in various positions of the vehicle including the front, sides and/or rear. Multiple sensors 42 may also be employed in multiple locations to provide multiple information from multiple positions of the vehicle.

Controller 26 may also be coupled to a camera system 43 having cameras 43a–43e. A stereo pair of cameras 42a, 42b may be mounted on the front of the vehicle to detect target objects in front of the vehicle, to measure the object size, range and relative velocity and to classify those objects into appropriate categories. Camera 43c may be mounted on the right side of the vehicle, camera 43d may be mounted on the left side of the vehicle, and camera 43e may be directed rearward of the vehicle. All or some of the cameras may be used in a commercial embodiment. Also, a stereo pair of cameras 43a, 43b may be replaced by a single camera (43a or 43b) depending on the roll condition measured by the system. Various types of cameras would be evident to those skilled in the art. Various types of cameras such as a CMOS-type camera or a CCD-type camera may be implemented to generate various image signals. As will be further described below, the various image signals may be analyzed to determine the various dynamic conditions of the vehicle.

Based upon inputs from the sensors and/or cameras, GPS, and lidar or radar, controller 26 may control a safety device 44. Depending on the desired sensitivity of the system and various other factors, not all the sensors 28–38, cameras 43a–43c, lidar or radar 42, or GPS 41 may be used in a commercial embodiment. Safety device 44 is part of a vehicle subsystem control. Safety device 44 may control a passive safety device 46 such as an airbag or a steering actuator 48, a braking actuator 50 at one or more of the wheels 12a, 12b, 13a, 13b of the vehicle. Engine intervention 52 may act to reduce engine power to provide a safety function. Also, other vehicle components such as a suspension control 54 may be used to adjust the suspension to prevent rollover. An anti-roll bar system 56 may be used to prevent rollover. The anti-roll bar system 56 may comprise a front or rear active anti-roll bar, or both. It should also be noted that the systems 48–56 may act alone or in various combinations to prevent the vehicle from rolling over. Certain systems 48–56 may act to prevent rollover where various dynamic conditions are sensed.

A warning device 60 may also be coupled to controller 26. Warning device may warn of various conditions such as an impeding rollover or an approach of an in-path object. The warnings are provided in time for the driver to take evasive action. The warning device may be a visual display such as warning lights or an alpha-numeric display such an LCD screen. The warning device may also be an audible display such as a warning buzzer, chime or bell. The warning device may also be a haptic warning such as a vibrating steering wheel. Of course, a combination of audible, visual, and haptic display may be implemented.

A level-based system 62 may also be coupled to controller 18. Level-based system 62 uses the pitch level or angle of the vehicle to adjust the system. Level-based system 62 may, for example, be a headlight adjustment system 64 or a suspension leveling system 66. Headlight adjustment system 64 adjusts the beam pattern downward for a loaded vehicle. Suspension leveling system 66 adjusts the suspension at the various corners of the vehicle to maintain the vehicle body relatively level. The level-based system 62 may also make an adjustment based on the roll angle of the vehicle.

Roll rate sensor 34 and pitch rate sensor 37 may sense the roll condition of the vehicle based on sensing the height of one or more points on the vehicle relative to the road surface. Sensors that may be used to achieve this include a radar-based proximity sensor, a laser-based proximity sensor and a sonar-based proximity sensor.

Roll rate sensor 34 and pitch rate sensor 37 may also sense the roll condition based on sensing the linear or rotational relative displacement or displacement velocity of one or more of the suspension chassis components which may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll condition may also be sensed by sensing the force or torque associated with the loading condition of one or more suspension or chassis components including a pressure transducer in an act of air suspension, a shock absorber sensor such as a load cell, a strain gauge, the steering system absolute or relative motor load, the steering system pressure of the hydraulic lines, a tire laterally force sensor or sensors, a longitudinal tire force sensor, a vertical tire force sensor or a tire sidewall torsion sensor.

The roll condition of the vehicle may also be established by one or more of the following translational or rotational positions, velocities or accelerations of the vehicle including a roll gyro, the roll rate sensor 34, the yaw rate sensor 28, the lateral acceleration sensor 32, a vertical acceleration sensor, a vehicle longitudinal acceleration sensor, lateral or vertical speed sensor including a wheel-based speed sensor, a radar-based speed sensor, a sonar-based speed sensor, a laser-based speed sensor or an optical based speed sensor.

Steering control 48 may control the position of the front right wheel actuator, the front left wheel actuator, the rear left wheel actuator, and the right rear wheel actuator. Although as described above, two or more of the actuators may be simultaneously controlled. For example, in a rack-and-pinion system, the two wheels coupled thereto are simultaneously controlled. Based on the inputs from sensors 28 through 38, controller 26 determines a roll condition and controls the steering position of the wheels.

Speed sensor 20 may be one of a variety of speed sensors known to those skilled in the art. For example, a suitable speed sensor may include a sensor at every wheel that is averaged by controller 26. Preferably, the controller translates the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. Speed may also be obtained from a transmission sensor. For example, if speed is determined while speeding up or braking around a corner, the lowest or highest wheel speed may not be used because of its error. Also, a transmission sensor may be used to determine vehicle speed.

Controller 26 may include an integrated roll control system 58 to detect and prevent rollover. While these functions are provided by controller 26, several controllers may be used to provide various determinations and control functions. The controller 26 may be programmed to provide the various functions.

Figure 3:
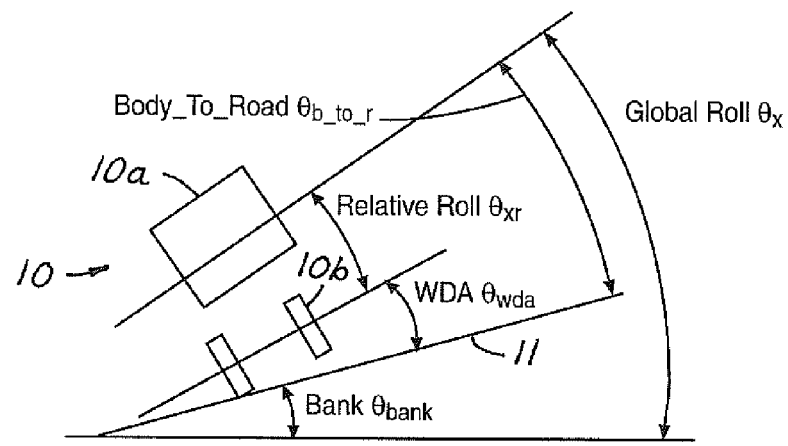
FIG. 3 is an end view of an automotive vehicle on a bank with definitions of various angles including global roll angle, relative roll angle, wheel departure angle (WDA), road bank angle and body-to-road angle.

Referring now to FIG. 3, the relationship of the various angles of the vehicle 10 relative to the road surface 11 is illustrated. The present teaching determines a wheel departure angle $\theta_{wda}$, which is the angle from the axle or the wheel axis to the road surface 11. Also shown is a reference road bank angle $\theta_{bank}$, which is shown relative to the vehicle 10 on a road surface. The vehicle 10 has a vehicle body 10a and vehicle suspension 10b. The relative roll angle $\theta_{xr}$ is the angle between the wheel axle and the body 10a. The global roll angle $\theta_x$ is the angle between the horizontal plane (e.g., at sea level) and the vehicle body 10a.

Figure 4:
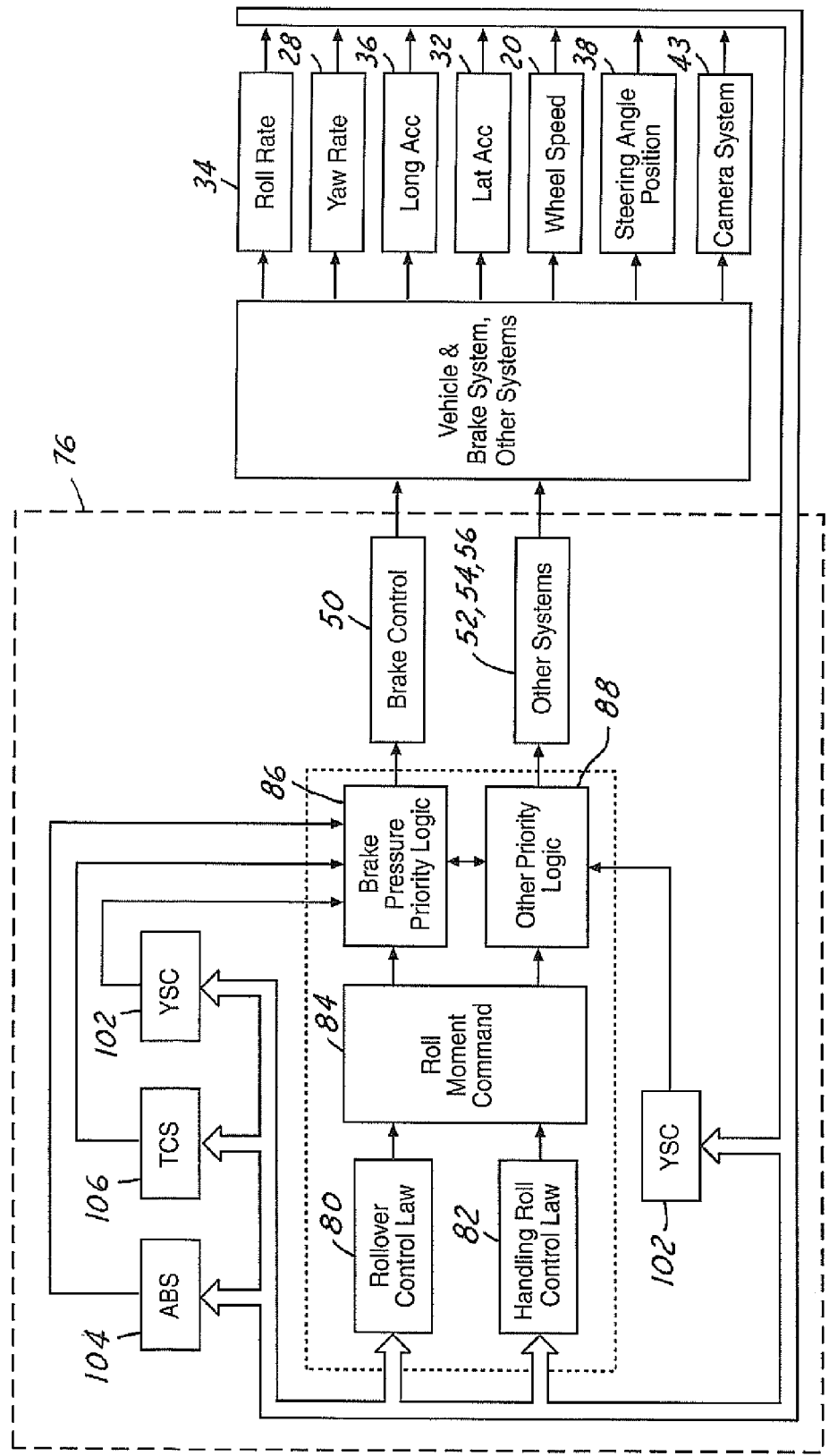
FIG. 4 is a block diagrammatic view of the controller of the present invention.

Referring now to FIG. 4, controller 26, and in particular the integrated roll control system 58, is illustrated in further detail. The integrated roll control system 58 includes rollover control law 80 and handling loss control law 82. The rollover control law 80 and handling loss control law 82 are coupled to a roll moment command 84. The rollover control law ultimately determines the rollover potential of the vehicle from the various inputs. The handling loss control 82 determines a loss of handling of the vehicle from the inputs. Handling loss may be wheels locking or slipping or the like. The output of the roll moment command 84 is used to control the brake pressure priority logic 86 and other priority logic 88. The other priority logic may include at least one of the steering system (actuator) 48, engine intervention 52, suspension control 54 and anti-roll bar system 56. It should be noted that in a simple system only one system such as braking or steering may be controlled to prevent rollover performed and thus other priority control logic may be eliminated. The brake pressure priority logic 86 and the other priority control logic 88 receive the roll angle from the roll moment command 84 and controls brake control 50 or other systems 52–56. The control provided by the brake control 50 and the other systems are fed back to the system through at least one of the roll rate sensor 34, longitudinal acceleration sensor 36, lateral acceleration sensor 32, wheel speed sensors 20, steering angle position sensor 38 and the camera system 43. The information from these systems is fed back to the yaw stability controller 102, an anti-lock brake system 104, and a traction control system 106. The anti-lock brake system 104 generates a brake control signal. The traction control system 106 generates a brake traction control signal. The yaw stability controller 102 generates a brake yaw control signal. The yaw stability controller 102 may also provide an input with respect to the yawing of the vehicle to the other priority logic 88 and the brake pressure priority logic 86. The controllers 102, 104, 106 may be separate devices or integrated into controller 26 above. Each controller 102, 104, 106 is part of a safety system 44 of FIG. 2. The brake pressure priority logic 86 receives the brake control signals and generates brake controls to prevent the vehicle from rolling over. The other systems including but not limited to the steering actuator 48, engine intervention 52, suspension control 54, and the anti-roll bar system 54 may also be controlled and coordinated with the brake control to prevent the vehicle from rolling over or losing handling. The anti-roll bar system, or other systems may be used to simultaneously control rollover while the brake system may be used to control yawing or vice-versa after both systems are used for rollover control. The anti-roll bars or other systems may also be controlled sequentially with the brakes to prevent rollover.

Figure 5:
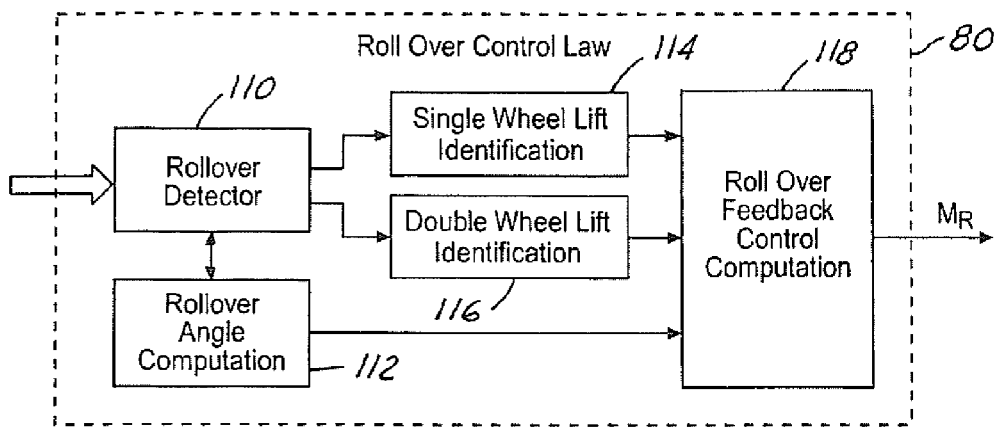
FIG. 5 is a block diagrammatic view of the rollover control law of FIG. 4.

Referring now to FIG. 5, rollover control law 80 is illustrated in further detail. Rollover control law 80 may comprise a rollover detector 110 that is coupled to the various sensors. Further, a roll angle computation 112 may also be performed by rollover control law 80. The rollover detector detects the presence of rollover and determines a roll angle of the vehicle. Rollover detector may, for example, provide a single wheel lift identification 114 or a double wheel lift identification 116. The output of the single wheel lift identification 114, double wheel lift identification 116, and roll angle computation 112 are provided to a rollover feedback control computation 118. The rollover feedback control computation generates a moment $M_R$ that is the roll moment of the vehicle. Thus, by knowing the roll moment of the vehicle the roll moment can be counteracted using one of the systems described below.

Figure 6:
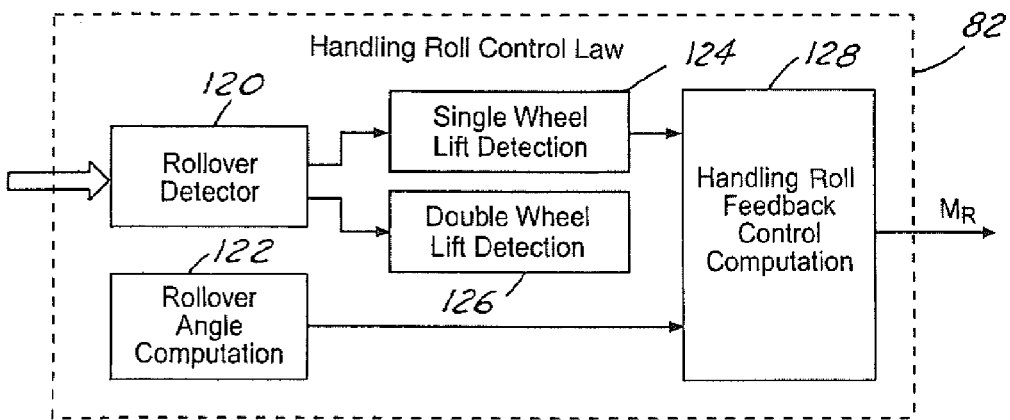
FIG. 6 is a block diagrammatic view of the handling loss control law of FIG. 4.

Referring now to FIG. 6, handling roll control law 82 may also consist of a rollover detector 120 and a roll angle computation 122. The roll detector in a similar manner to the rollover control law 80 may provide an indication of single wheel lift detection 124, or double wheel lift detection 126. Single wheel lift detection 124, double wheel lift detection 126, and roll angle computation 122 may be provided to a handling roll feedback control computation 128 that generates a roll moment $M_R$ of the vehicle. By knowing the roll angle of the vehicle, the roll moment may be counteracted.

Figure 7:
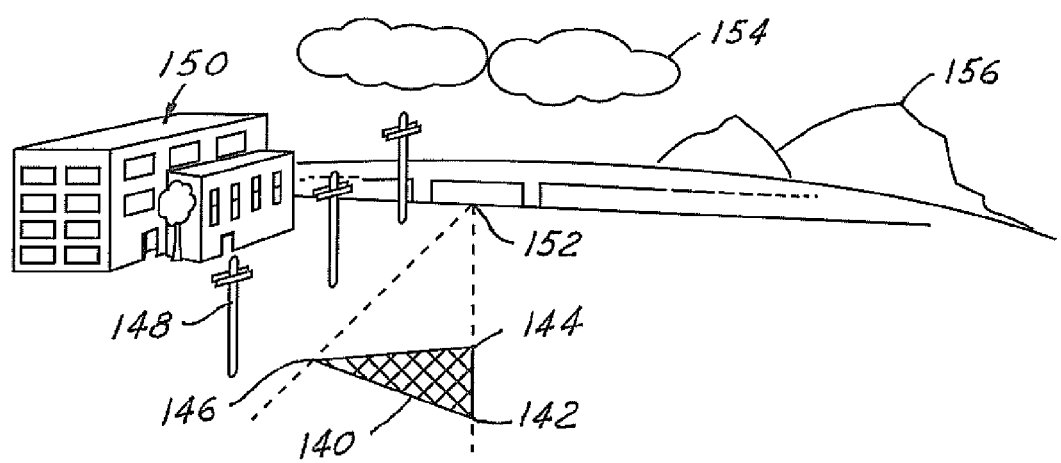
FIG. 7 is a perspective view of a field of view of a camera from which image signals are derived.

Referring now to FIG. 7, a perspective view of a field of view of one or both of the front cameras is illustrated. Similar views would be available to the side cameras. Similar views would also be generated from the rear camera. Many of the calculations from the front camera may be performed by the rear camera. Based on various cues, various dynamic conditions such as the roll angle, vehicle speed, body-to-road angle, longitudinal and lateral velocities, pitch angle, road departure, an in-path object, wheels lifting, and body slides that may be determined. The front, rear, side, and front or rear and a side camera may be used to obtain the points or visual cues described below.

One such way in which the roll angle between the body and the road surface may be estimated is by determining a road surface plane 140 by identifying discernable features on the road surface, such as solid lines, dashed lines, cats eyes, or other road surface markings or road texture. The range to these features may be determined based on a stereo vision-based depth map, monocular vision-based perspective analysis or matching and scaling the observed feature to a pre-defined feature of known dimension. Analysis of the change in perspective of the defined road surface over time can be used to estimate body to road roll angle.

The global vehicle longitudinal velocity and lateral velocity relative to the lanes can be determined by measuring the relative velocity of defined stationary road cues including points 142, 144, and 146.

The absolute roll angle may be estimated based on analysis of objects with strong vertical or horizontal structures such as street lights 148, bridges, signs or buildings 150. Such an algorithm uses multiple possible targets in a filtering strategy to remove outliers to provide an accurate result. Further, the global lateral velocity may be estimated based on a measurement of range, range rate, angle, and a change in the stationary structures.

A define horizon line may be used to estimate the absolute roll angle. The horizon 152 is the location in the image where the road approaches zero width. It can be determined by detecting the transition from the ground to the sky in the image and/or it may be determined by calculating the point at which the lanes approach zero width.

The roll rate may be estimated by measuring the change in the roll angle to distant objects such as clouds 154 or mountains 156.

During night conditions, the illumination pattern on the road due to the headlights and parking lights of the vehicle may be used. Each vehicle has a unique consistent characteristic of bright spots, dark spots, and beam cutoff. By analyzing the projected pattern it is possible to determine the road angle between the vehicle body and the road surface.

Ego-motion may also be analyzed to determine the vehicle motion. Image values in two sequential images are analyzed to determine a best fit motion that corresponds to the change in the image. The global approach may be very robust due to varying road and weather conditions. Global roll rate, pitch rate, yaw rate, lateral and longitudinal speeds may be determined. Roll pitch and yaw angles may also be calculated based on the velocity signals.

The vision sensing system may also be used to detect in-path objects that may, for example, present a tripping hazard for the vehicle.

A vision-based, radar-based, or lidar-based sensing system may also be used to detect wet roads, spray and snow conditions.

Tripping objects may be detected in various manners. Tripping objects, such as curbs, are low profile objects that if the vehicle slides into may cause a rollover. If the vehicle is yawing, the front and side cameras may be used. Further, the lateral velocity of the vehicle may be determined by the side cameras in relation to various objects. Combinations of the side camera and front cameras may be used to determine the vehicle side slip. In prior systems that use only sensors, thresholds for entering roll stability control and yaw stability control are set to take into account variability within the sensors. That is, because the angles are not measured directly, signal conditioners are implemented to estimate the road bank and vehicle roll angle. By improving the accuracy of the roll angle, the thresholds for entry into the yaw stability control events can be reduced allowing yaw stability control to activate sooner, if necessary. The present invention also improves entry into a wheel lift detection algorithm. An active wheel lift detection scheme starts to detect that the wheels have lifted based on an increase in roll angle. The threshold for entry is relatively low due to the indirect measurements. When a rollover condition is approaching, the system actively determines whether the wheels are lifted. Thus, a more accurate determination of the roll angle of the vehicle may result in improved entry into the wheel lift detection strategy. Thus, the wheel lift detection entry criteria or lift state can be improved by directly measuring the angle between the vehicle body and the road surface with a vision sensor.

The vision sensing system may also be used to differentiate between aggressive driving and loss of control conditions by measuring the lateral velocity relative to the lane markings and/or the road edges with a vision sensor, the yaw stability control system and the roll stability control system may differentiate between aggressive driving and potential loss of control conditions. For example, when the vehicle is within the lane markings during aggressive driving, the yaw stability control and roll stability control entry thresholds may be increased. Should the vehicle be outside or projected to be outside the vehicle lane markings in the near future, the entry thresholds may be reduced.

In a typical stability control system a plurality of wheel speed sensors are used to obtain the longitudinal speed of the vehicle. However, during wheel lock or wheel slip conditions if image data is available from the vision system, a determination may be made as to the longitudinal vehicle velocity from the vision system. Also, a radar-based sensor can measure the longitudinal speed by measuring the Doppler shift of signal reflections off of the road surface. Also, a lidar-based sensor can measure the longitudinal speed by measuring the relative velocity to stationary objects. The wheel lock or a heavy wheel slip condition may be determined by monitoring the wheel speeds. If no output or near zero output is determined from one of the plurality of the wheel speed sensors, wheel lock may be indicated. If one wheel has a low speed relative to the others, wheel slip may be indicated. Thus, when wheel slip or wheel lock is not determined, the system may use the output of the wheel speed sensors to determine the longitudinal speed of the vehicle. When a wheel lock or wheel slip condition exists, the wheel speed derived from the image, radar, or lidar signals may be used as an indication of the longitudinal speed of the vehicle.

The present system may also be used to improve the side slip estimation of the vehicle. That is, the image signals generated by the cameras may be used to estimate the lateral velocity, which in turn may be used in the body side slip determination. Typically, side slip is measured based on the wheel speeds, the steering wheel angle, the lateral acceleration and the yaw rate values. However, side slip is difficult to measure accurately in low friction side slip conditions such as wet or icy roads. The side slip angle is the tangent of the ratio of the forward velocity and side velocity of the vehicle. Once the side slip angle is determined using the image signal, the dynamic control system may be controlled. It should also be noted that the longitudinal velocity may be obtained using the image, radar, or lidar signals or wheel speed sensors as described above.

The image, radar, or lidar-based signals may also be used to estimate a low mu of the vehicle surface. That is, wet or snow covered conditions may be estimated using the image, radar, or lidar-based signals. Vision-based sensors can estimate wet or snow covered conditions based on road texture, reflectivity, and/or color analysis, road spray detection, or water drop patterns on the camera surface. Radar and lidar-based sensors can estimate wet or snow covered conditions based on analysis of the signal return. The controller, based upon the image, radar, or lidar-based signals, may generate a low mu identification signal of the road surface. The system may also quantify the level of mu so as to differentiate wet versus snow-covered roads. That is, a first low mu value may be identified as well as a second low mu value lower than the first low mu value. The second value may correspond to snow whereas the first value may correspond to rain. In response to the low mu identification signal, a dynamics control system may be operated. For example, a roll stability control system or a yaw control system may have the entry thresholds changed in response to the low mu identification signal.

The image, radar, or lidar-based signals may also be used to determine the presence of an in-path hazard in response to the image signal. The dynamics control system may have different strategies based upon whether or not an object is in the path or not. The different strategies may include the entry criteria for control or the control thresholds contained therein. The different strategies and entry are vehicle specific and are determined through vehicle testing. The difference between a first control strategy and a second control strategy is that more aggressive maneuvers may take place in the presence of an in-path hazard. Thus, in response to the image, radar, or lidar-based signals, a second control strategy may be used rather than a first control strategy. The dynamic control system is then operated in response to the second control strategy. The various types of dynamic control systems described above such as anti-lock brakes, traction control, roll stability control, and yaw stability control may all benefit from the two control strategy approach when an in-path hazard is present.

Another way in which the image signals may be used is for correction of the sensor signals from the integrated measurement unit 40. One way in which sensor drift may be corrected is to use GPS. GPS provides a correction mechanism every 20 Hz while IMUs provide a high frequency signal, for example, in the 143 Hz range. Various angular rates such as roll, pitch and yaw rates may be computed from the image signals. That is, because the image signals may directly measure one of the vehicle attitudes or velocities of the vehicle, the sensor drift from the integrated measurement unit may be periodically corrected. The correction may take the form of correcting the drift error of the various signals from the integrated measurement unit. Thus, corrected sensor signals are formed. The corrected sensor signals may then be used to operate the dynamic control system. As mentioned above, this correction may take place several times a second. For example, correction may take place at a rate of 35 Hz.

Another way in which the image signals may be used is to control the level-based system 62 shown in FIG. 2. As mentioned above, the level-based system may include a headlight adjustment system 64 or a suspension leveling system 66. Both of those systems may benefit from a determination of the pitch angle of the vehicle. Thus, the image signals from the vision system may be used by the controller 26 to determine a pitch angle estimate. Based upon the pitch angle estimate from the image signal, the level-based system may be controlled. In addition, the image signals may be used to generate a roll angle estimate. The roll angle estimate together with the pitch angle estimate may be used to control the level-based system.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

The invention claimed is:

1. A control system for an automotive vehicle comprising:
   a camera-based vision system generating image signals;
   a rollover control system; and
   a controller coupled to the camera system and the rollover control system, said controller generating a dynamic vehicle characteristic signal in response to the image signals, said controller controlling the rollover control system in response to the dynamic vehicle control signal.

2. A control system as recited in claim 1 wherein the dynamic vehicle characteristic signal comprises a vehicle roll direction angle signal.

3. A control system as recited in claim 1 further comprising a yaw control system, wherein said controller chooses between the yaw stability control system or the rollover control system in response to the dynamic vehicle characteristic.

4. A control system as recited in claim 1 wherein the dynamic vehicle characteristic signal comprises a vehicle pitch angle signal.

5. A control system as recited in claim 1 wherein the dynamic vehicle characteristic signal comprises a lateral velocity signal.

6. A control system as recited in claim 5 wherein said controller determines an aggressive driving status or loss of control status in response to the lateral velocity signal, said controller activating a yaw stability control system or a rollover control system in response to determining the aggressive driving status or loss of control status.

7. A control system as recited in claim 1 wherein the dynamic vehicle characteristic signal comprises a longitudinal velocity signal.

8. A control system as recited in claim 1 wherein the dynamic vehicle characteristic signal comprises a road departure signal.

9. A control system as recited in claim 8 further comprising a yaw stability control signal, said controller controlling the yaw stability control system in response to the road departure signal.

10. A control system as recited in claim 1 wherein the dynamic vehicle characteristic signal comprises an in-path object signal.

11. A control system as recited in claim 1 wherein the dynamic vehicle characteristic signal comprises a wheel lifted signal.

12. A control system as recited in claim 1 wherein the dynamic vehicle characteristic signal comprises a body-to-road angle signal.

13. A control system as recited in claim 12 wherein the controller enters a wheel lift determination when the body-to-road angle is above a predetermined threshold.

14. A control system as recited in claim 1 further comprising generating a plurality of wheel speeds from a wheel speed sensors, wherein said controller identifying a wheel slip condition or wheel lock condition, said controller generating a longitudinal speed signal from the dynamic vehicle characteristic signal during the wheel slip or wheel lock condition.

15. A control system as recited in claim 1 wherein the dynamic vehicle characteristic signal comprises a body side slip signal.

16. A control system as recited in claim 1 wherein the dynamic vehicle characteristic signal comprises a rotational moment of inertia signal.

17. A control system as recited in claim 1 wherein the camera system comprises a stereo pair of cameras.

18. A control system as recited in claim 1 wherein the camera system comprises a front camera and side camera.

19. A control system as recited in claim 1 wherein the camera system comprises a rear camera and side camera.

20. A control system as recited in claim 1 further comprising a radar, lidar, or sonar-based system generating environmental sensing signals; and said controller generating a dynamic vehicle characteristic signal in response to the image signals and the environmental sensing signals.

21. A method of controlling a rollover control system of automotive vehicle comprising:
   generating an image signal;
   generating a dynamic vehicle characteristic signal in response to the image signal; and
   controlling the rollover control system in response to the dynamic vehicle control signal.

22. A method as recited in claim 21 wherein generating a dynamic vehicle characteristic signal comprises generating a vehicle roll direction angle signal.

23. A method as recited in claim 21 further comprising a yaw control system, choosing between the yaw stability control system or the rollover control system in response to the dynamic vehicle characteristic signal.

24. A method as recited in claim 21 wherein generating a dynamic vehicle characteristic signal comprises generating a vehicle pitch angle signal.

25. A method as recited in claim 21 wherein generating a dynamic vehicle characteristic signal comprises generating a lateral velocity signal.

26. A method as recited in claim 25 further comprising determining an aggressive driving status or loss of control status in response to the lateral velocity signal, said controller activating a yaw stability control system or a rollover control system in response to determining the aggressive driving status or loss of control status.

27. A method as recited in claim 21 wherein generating a dynamic vehicle characteristic signal comprises generating a longitudinal velocity signal.

28. A method as recited in claim 21 wherein generating a dynamic vehicle characteristic signal comprises generating a road departure signal.

29. A method as recited in claim 28 further comprising a yaw stability control signal, said further comprising controlling the yaw stability control system in response to the road departure signal.

30. A method as recited in claim 21 wherein generating a dynamic vehicle characteristic signal comprises generating an in-path object signal.

31. A method as recited in claim 21 wherein generating a dynamic vehicle characteristic signal comprises generating a wheel lifted signal.

32. A method as recited in claim 21 wherein generating a dynamic vehicle characteristic signal comprises generating a body-to-road angle signal.

33. A method as recited in claim 21 further comprising entering a wheel lift determination when the body-to-road angle is above a predetermined threshold.

34. A method as recited in claim 21 further comprising generating a plurality of wheel speeds from a wheel speed sensors, identifying a wheel slip condition or wheel rock condition, generating a longitudinal speed signal in response to the dynamic vehicle characteristic signal during the wheel slip or wheel lock condition.

35. A method as recited in claim 21 wherein generating a dynamic vehicle characteristic signal comprises generating a body side slip signal.

* * * * *